(12) United States Patent
Ryu

(10) Patent No.: US 9,744,985 B2
(45) Date of Patent: Aug. 29, 2017

(54) RACK BAR UNIT OF VEHICLE STEERING DEVICE

(71) Applicant: Hyundai Motor Company, Seoul (KR)

(72) Inventor: Sang Woock Ryu, Anyang-si (KR)

(73) Assignee: Hyundai Motor Company, Seoul (KR)

( * ) Notice: Subject to any disclaimer, the term of this patent is extended or adjusted under 35 U.S.C. 154(b) by 33 days.

(21) Appl. No.: 14/885,204

(22) Filed: Oct. 16, 2015

(65) Prior Publication Data

US 2016/0236705 A1   Aug. 18, 2016

(30) Foreign Application Priority Data

Feb. 17, 2015   (KR) .................. 10-2015-0024444

(51) Int. Cl.
   *B62D 3/00*     (2006.01)
   *B62D 3/12*     (2006.01)
   *F16H 55/26*    (2006.01)

(52) U.S. Cl.
   CPC ............. *B62D 3/126* (2013.01); *F16H 55/26* (2013.01)

(58) Field of Classification Search
   CPC .................. B62D 3/126; F16H 55/26
   See application file for complete search history.

(56) References Cited

U.S. PATENT DOCUMENTS

| | | | | |
|---|---|---|---|---|
| 3,074,735 A * | 1/1963 | Ulrich | ............ | B62D 3/12 280/93.514 |
| 3,834,247 A * | 9/1974 | Belsdorf | ............ | B62D 3/12 74/422 |
| 7,207,231 B2 * | 4/2007 | Saarinen | ............ | B21H 1/10 29/893.34 |
| 8,613,459 B2 * | 12/2013 | Yang | ............ | B62D 3/126 280/93.514 |
| 9,273,766 B2 * | 3/2016 | Shimizu | ............ | F16H 25/20 |
| 2006/0213298 A1 * | 9/2006 | Tateishi | ............ | F16H 25/2204 74/89.23 |
| 2010/0162843 A1 * | 7/2010 | Kobayashi | ............ | B21K 1/767 74/422 |
| 2011/0204588 A1 * | 8/2011 | Yang | ............ | B62D 3/126 280/93.514 |
| 2012/0186085 A1 * | 7/2012 | Kobayashi | ............ | B21K 1/767 29/893.33 |
| 2013/0112022 A1 * | 5/2013 | Shimizu | ............ | F16H 25/20 74/89.34 |

FOREIGN PATENT DOCUMENTS

| | | |
|---|---|---|
| JP | 2004-44720 A | 2/2004 |
| KR | 10-2012-0127923 A | 11/2012 |

\* cited by examiner

*Primary Examiner* — Victor MacArthur
(74) *Attorney, Agent, or Firm* — Morgan, Lewis & Bockius LLP

(57) ABSTRACT

A rack bar unit of a vehicle steering device may include a rack bar body and a rack gear made of different materials, in which the rack gear may be coupled to the rack bar body.

6 Claims, 3 Drawing Sheets

RACK BAR UNIT OF VEHICLE STEERING DEVICE

CROSS-REFERENCE TO RELATED APPLICATION

This application claims priority to and the benefit of Korean Patent Application No. 10-2015-0024444 filed in the Korean Intellectual Property Office on Feb. 17, 2015, the entire contents of which are incorporated herein by reference.

BACKGROUND OF THE INVENTION

Field of the Invention

The present invention relates to a rack bar unit of a vehicle steering device, and more particularly, to a rack bar unit of a vehicle steering device, in which a rack gear made of carbon steel is coupled to a rack bar body made of magnesium.

Description of the Related Art

In general, a vehicle steering device as a device for a driver to arbitrarily steer a driving direction of a vehicle includes a steering operating mechanism including a steering handle directly operated by the driver and a steering column integrally connected with the steering handle and rotatably supporting the steering handle while rotating together with the steering handle, a steering gear box installed in link with the steering column and receiving a rotary motion of the steering column and converting the received rotary motion into a horizontal linear motion, and a steering link mechanism interlockedly coupled to the steering gear box and connected to a vehicle wheel and thus transferring the horizontal linear motion of the steering gear box to the vehicle wheel to steer the vehicle wheel.

The steering gear box includes a pinion gear which rotates by receiving operating force of the steering handle of the driver and a rack bar including a rack gear which engages with the pinion gear and converts the rotary motion of the pinion gear into the horizontal linear motion.

FIG. 1 illustrates one example of a steering gear box and a steering link mechanism in the related art.

A steering gear box 10 includes a rack bar 12 deployed to extend in the width direction of a vehicle and a pinion gear 14 which engages with the rack bar 12 and connected with a steering handle (not illustrated) to receive operating force of a steering handle of a driver and horizontally linearly move the rack bar 12.

The steering link mechanism 20 includes a tie rod 22 interlockedly connected to an end of the rack bar 12 and a tie rod end 26 interlockedly connected to an end of the tie rod 22 and mounted with a ball joint 24.

A wheel bearing 30 is mounted on a vehicle wheel in order to rotatably support the vehicle wheel, a knuckle 40 is fastened to the wheel bearing 30 in order to steer the vehicle wheel, and the knuckle 40 is interlockedly connected to the tie rod end 26 through the ball joint 24.

As a result, when the driver operates the steering handle, an operating motion of the steering handle is transferred to the pinion gear 14 through the steering column to rotate the pinion gear 14, the rotary motion of the pinion gear 14 horizontally linearly moves the rack bar 12, and the horizontal linear motion of the rack bar 12 is transferred to the vehicle wheel via the knuckle 40 through the tie rod 22 and the tie rod end 26 to steer the vehicle wheel in an intended direction of the driver.

Since the steering device in the related art is a primary component directly connected with safety of the driver and a vehicle passenger, the steering device is manufactured with sufficient strength so that damage of the component is minimized even under a worst situation, and as a result, in particular, a diameter of the rack bar is designed to be large in order to improve the strength of the rack bar.

However, when the diameter of the rack bar increases, a total weight of the steering device increases while the sizes of components associated with the rack bar also increase, and as a result, weight and manufacturing cost of the vehicle increase and a steering operating sense also deteriorates while steering.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a rack back unit of a vehicle steering device which can increase rigidity of a steering rack bar without increasing a diameter of the steering rack bar to reduce a total weight and manufacturing cost of a steering device and improve steering stability by increasing rigidity.

According to various aspects of the present invention, a rack bar unit of a vehicle steering device, the rack bar unit may include a rack bar body and a rack gear made of different materials, in which the rack gear may be coupled to the rack bar body.

The rack bar body may be formed by a magnesium alloy casting process.

The rack gear may be manufactured by a forging press process with high-carbon chrome steel.

The rack bar body and the rack gear may be detachably coupled to each other.

The rack bar body may include a hollow pipe shaped body part which is vacant therein, and a coupling part integrally formed in the body part and coupled to the rack gear.

The coupling part may have a same diameter as the body part and may be cut in an axial direction to have a semi-circular shape, and a coupling space having a predetermined size, which the rack gear is inserted into and coupled to, may be formed between a flat plane of the coupling part and an outer peripheral surface of the body part.

A circular boss may be integrally formed at one axial end of the coupling part to restrict the coupling space, a through fastening hole is formed at the boss, and a receiving space is formed in the boss.

The rack gear and the rack bar body may be fixedly fastened to each other by a fastening bolt fastened through the fastening hole, the fastening bolt may be fastened through a fastening plate having a disk shape, and the fastening plate may be inserted into and received in the receiving space.

The rack gear may have a structure in which multiple rack gear teeth are formed at a predetermined interval in a longitudinal direction thereof, and the rack gear may include semi-circular shaped bosses at both ends thereof, and may be fastened with the fastening bolt while a first boss contacts a boundary surface between the body part and the coupling part and a second boss contacts a boss of the rack bar body.

According to various embodiments of the present invention, a rack bar unit for a vehicle steering device includes a rack bar body made of magnesium and a rack gear made of carbon steel, which is associated therewith and as a result, total strength of the rack bar unit can be improved by the rack gear manufactured by a high-rigidity forging process, and as a result, a diameter of the rack bar unit needs not be increased in order to increase the strength of the rack bar unit, thereby reducing weight and a size, and manufacturing cost of the rack bar unit.

Further, as the rack gear is manufactured by the forging process, a process of manufacturing the rack gear in the related art with a brooch tool is not required to reduce manufacturing cost by simplification of the process and the total weight of the rack bar unit is reduced to improve a steering operating sense and steering responsiveness.

Moreover, when a steering gear ratio is changed, since only a rack gear component is just changed, the change of the steering gear ratio and application thereof are easy and the rack bar unit can be generally applied to all vehicles.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
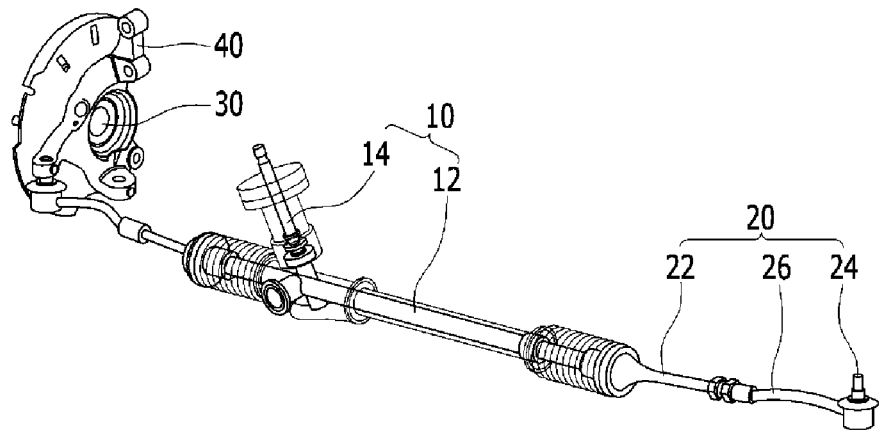
FIG. 1 is a partial detailed perspective view of a steering operating device of a vehicle in the related art.
Figure 2:
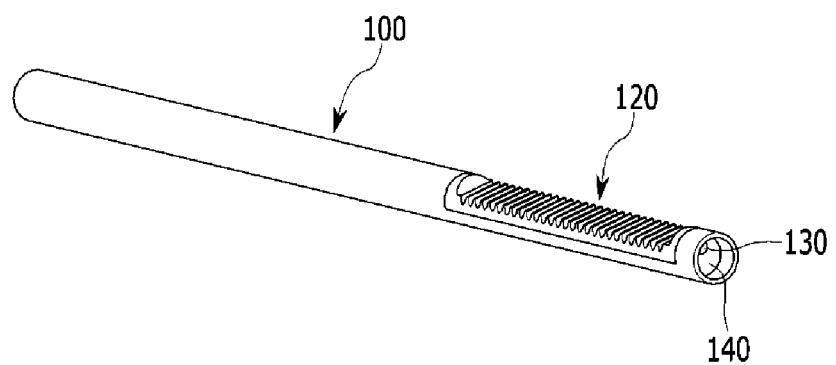
FIG. 2 is a perspective view of an exemplary rack bar unit according to the present invention.
Figure 3:
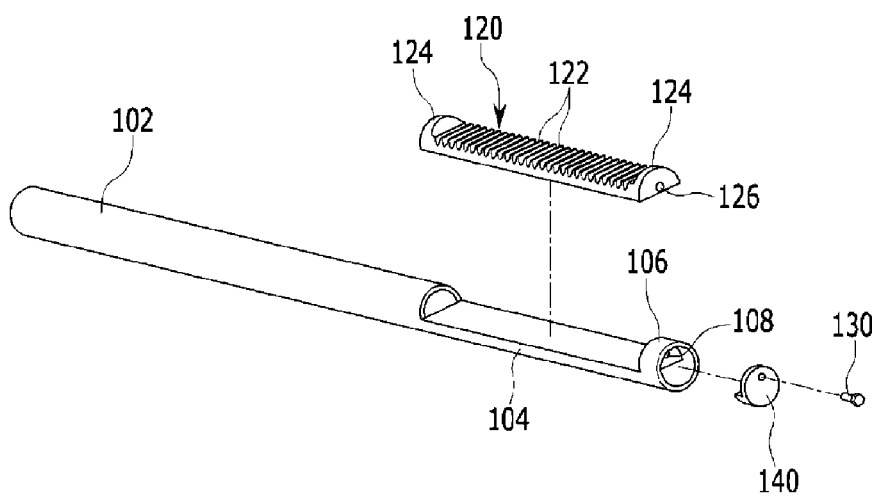
FIG. 3 is an exploded perspective view of the exemplary rack bar unit according to the present invention.

Referring to FIGS. 2 and 3, a rack bar unit of a vehicle steering device according to various embodiments of the present invention may include a rack bar body 100 having a substantially bar shape and a rack gear 120 detachably coupled to the rack bar body 100.

The rack bar body 100 may include a hollow pipe shaped body part 102 which is vacant therein and a coupling part 104 integrally formed in the body part 102.

The coupling part 104 has substantially the same diameter as the body part 102 and is cut in an axial direction to have a semicircular shape.

As a result, a coupling space having a predetermined size may be formed between a flat plane of the coupling part 104 and an outer peripheral surface of the body part 102 and the rack gear 120 may be inserted into and coupled to the coupling space.

Further, a circular boss 106 is integrally formed at one axial end of the coupling part 104 to restrict the coupling space, and a through fastening hole 108 may be formed at the boss 106 and a receiving space may be formed in the boss 106.

The rack gear 120 and the rack bar body 100 may be fixed and fastened to each other by a fastening bolt 130 fastened through the fastening hole 108, the fastening bolt 130 may be fastened through a fastening plate 140 having a substantially disk shape, and the fastening plate 140 may be inserted and received into the receiving space.

The fastening plate 140 may serve to distribute a fastening load of the fastening bolt 130.

The rack bar body 100 may be manufactured by a forging process with a magnesium alloy and the rack gear 120 may be manufactured by a forging press process with for example, heat-processed high-carbon chrome steel (S45C).

The rack gear 120 may have a structure in which multiple rack gear teeth 122 are formed at a predetermined interval in the longitudinal direction thereof and the rack gear 120 may be manufactured by the forging process.

The rack gear 120 may include semi-circular shaped bosses 124 at both ends thereof, and one boss 124 may be assembled while contacting a boundary surface between the body part 102 and the coupling part 104 and the other boss 124 may be fastened with the bolt 130 while contacting a boss 106 of the rack bar body 100, and a fastening hole 126 may be formed at the other boss in order to fasten the fastening bolt 130.

By the rack bar unit of the vehicle steering device according to the exemplary embodiment of the present invention, which is configured as above, as the rack gear 120 is manufactured by the forging process with the high-carbon chrome steel, the rack bar unit according to the exemplary embodiment of the present invention can have approximately three times more strength than the rack bar in the related art. As a result, while the strength of the rack bar in the related art is maintained, the diameter of the rack bar may be decreased inversely proportionate to the increased strength.

As the diameter of the rack bar may be reduced while the strength of the rack bar in the related art is maintained, weight and manufacturing cost may be reduced due to miniaturization of components of the steering device, and as the rack gear is manufactured by the forging press process, the brooch tool for forming the rack gear teeth in the rack bar in the related art needs not be used, thereby reducing manufacturing cost with reduction of the manufacturing process.

As the rack bar body is manufactured by a light magnesium alloy, the weight of the rack bar unit may be reduced, and as a result, the steering operating sense and the steering responsiveness may be improved.

Since only the rack gear is changed and applied according to a vehicle type, the rack bar unit may be generally applied to all vehicle types and as the rack bar body is manufactured by a casting process with the magnesium alloy and the rack gear is manufactured by the forging press process, the process may be reduced and a manufacturing time may be shortened as compared with the manufacturing of the rack bar in the related art.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A rack bar unit of a vehicle steering device, the rack bar unit comprising:
    a rack bar body and a rack gear made of different materials,
    wherein the rack gear is coupled to the rack bar body,
    wherein the rack bar body comprises:
        a hollow pipe shaped body part which is vacant therein, and
        a coupling part integrally formed in the body part and coupled to the rack gear,
    wherein the coupling part has a same diameter as the body part and is cut in an axial direction to have a semi-circular shape, and
    wherein a coupling space having a predetermined size, which the rack gear is inserted into and coupled to, is formed between a flat plane of the coupling part and an outer peripheral surface of the body part, and
    wherein:
        a circular boss is integrally formed at one axial end of the coupling part to restrict the coupling space,
        a through fastening hole is formed at the boss, and
        a receiving space is formed in the boss.

2. The rack bar unit of claim 1, wherein the rack bar body is formed by a magnesium alloy casting process.

3. The rack bar unit of claim 1, wherein the rack gear is manufactured by a forging press process with high-carbon chrome steel.

4. The rack bar unit of claim 1, wherein the rack bar body and the rack gear are detachably coupled to each other.

5. The rack bar unit of claim 1, wherein:
    the rack gear and the rack bar body are fixedly fastened to each other by a fastening bolt fastened through the fastening hole,
    the fastening bolt is fastened through a fastening plate having a disk shape, and
    the fastening plate is inserted into and received in the receiving space.

6. The rack bar unit of claim 5, wherein:
    the rack gear has a structure in which multiple rack gear teeth are formed at a predetermined interval in a longitudinal direction thereof, and
    the rack gear includes semi-circular shaped bosses at both ends thereof, and is fastened with the fastening bolt while a first boss contacts a boundary surface between the body part and the coupling part and a second boss contacts a boss of the rack bar body.

* * * * *